(12) United States Patent
Klint et al.

(10) Patent No.: US 7,702,839 B2
(45) Date of Patent: Apr. 20, 2010

(54) MEMORY INTERFACE FOR VOLATILE AND NON-VOLATILE MEMORY DEVICES

(75) Inventors: Jani Klint, Tampere (FI); Sakari Sippola, Tampere (FI); Matti Floman, Kangasala (FI); Jukka-Pekka Vihmalo, Tampere (FI)

(73) Assignee: Nokia Corporation, Espoo (FI)

( * ) Notice: Subject to any disclaimer, the term of this patent is extended or adjusted under 35 U.S.C. 154(b) by 0 days.

(21) Appl. No.: 11/105,324

(22) Filed: Apr. 12, 2005

(65) Prior Publication Data

US 2006/0230250 A1      Oct. 12, 2006

(51) Int. Cl.
*G06F 13/14* (2006.01)
(52) U.S. Cl. ...................................... 710/305
(58) Field of Classification Search ................ 710/112, 710/305, 105, 110; 712/41; 365/198
See application file for complete search history.

(56) References Cited

U.S. PATENT DOCUMENTS

| | | | |
|---|---|---|---|
| 5,872,940 A | | 2/1999 | Circello et al. |
| 6,085,284 A | | 7/2000 | Farmwald et al. |
| 6,260,127 B1 | * | 7/2001 | Olarig et al. ................. 711/167 |
| 6,467,009 B1 | * | 10/2002 | Winegarden et al. ......... 710/305 |
| 6,490,638 B1 | * | 12/2002 | Ha et al. ........................ 710/15 |
| 6,516,366 B1 | * | 2/2003 | Gates et al. .................. 710/105 |
| 6,526,469 B1 | * | 2/2003 | Drehmel et al. ............. 710/306 |
| 6,732,208 B1 | * | 5/2004 | Alsaadi et al. ............... 710/112 |
| 6,754,119 B2 | * | 6/2004 | Lee et al. ...................... 365/205 |
| 6,766,438 B1 | * | 7/2004 | Haas ............................. 712/41 |
| 6,917,546 B2 | * | 7/2005 | Matsui ........................ 365/198 |
| 6,922,770 B2 | * | 7/2005 | Shanmugasundaram et al. ........................... 711/209 |
| 6,954,809 B2 | * | 10/2005 | Kuo ............................ 710/107 |
| 6,970,966 B2 | * | 11/2005 | Gemelli et al. .............. 710/305 |
| 7,039,734 B2 | * | 5/2006 | Sun et al. ..................... 710/110 |
| 2002/0057595 A1 | * | 5/2002 | Kobayashi et al. ...... 365/185.03 |
| 2005/0166008 A1 | * | 7/2005 | Dortu ......................... 711/105 |

FOREIGN PATENT DOCUMENTS

WO        01/42929        6/2001

OTHER PUBLICATIONS

"Direct Rambus RIMM Module" XP002926177, Aug. 1998, pp. 1-16.
Communication pursuant to Article 94(3) EPC (Application No. 06 711 061.9-1229) dated May 29, 2008, Form 2001 (2 pages) and Form 2906 (2 pages).

* cited by examiner

*Primary Examiner*—Thomas Lee
*Assistant Examiner*—Mohammed H Rehman

(57) ABSTRACT

Accessing data stored in a memory device through an interface, with addressing data on the memory device through at least one address bus, controlling at least data flow to and from the memory device through at least one command bus, and transferring data to and from the memory through at least one data bus wherein commands on the command bus are adjusted depending on the type of memory connected to the interface.

16 Claims, 6 Drawing Sheets

| Command (for an example) | Rising edge | | Falling edge | |
|---|---|---|---|---|
| | CMD0 | CMD1 | CMD0 | CMD1 |
| Precharge power down exit & Active power down exit & Self refresh exit | 0 | 0 | 0 | 0 |
| Autorefresh | 0 | 0 | 0 | 1 |
| Self refresh entry | 0 | 0 | 1 | 0 |
| Bank active&row addr | 0 | 0 | 1 | 1 |
| Read&colum add: Auto precharge disable | 0 | 1 | 0 | 0 |
| Read&colum add: Auto precharge enable | 0 | 1 | 0 | 1 |
| Write&colum add: Auto precharge disable | 0 | 1 | 1 | 0 |
| Write&colum add: Auto precharge enable | 0 | 1 | 1 | 1 |
| Burst stop | 1 | 0 | 0 | 0 |
| Precharge (entry/exit) | 1 | 0 | 0 | 1 |
| Active power down entry | 1 | 0 | 1 | 0 |
| Precharge power down mode entry | 1 | 0 | 1 | 1 |
| Mode Register Set (MRS) | 1 | 1 | 0 | 0 |
| Non-volatile command 1 | 1 | 1 | 0 | 1 |
| Non-volatile command 2 (optional) | 1 | 1 | 1 | 0 |
| NOP | 1 | 1 | 1 | 1 |

FIG. 2

MEMORY INTERFACE FOR VOLATILE AND NON-VOLATILE MEMORY DEVICES

FIELD OF THE INVENTION

The application relates in general to accessing data stored in a memory device through an interface.

BACKGROUND OF THE INVENTION

Memory technology implies the need for accessing data within memory devices, such as DRAM or other memory devices. Therefore, different addressing strategies have already been proposed.

A possible feature of DRAMs is address multiplexing. This technique enables splitting the address in half and feeding each half in turn to the chip on the address bus pins.

The chip has a large array of memory capacitors that are arranged in rows and columns. To read one location in the array, the control circuit first calculates its row number, which it places on the DRAM's address pins. It then toggles the row address select (RAS) pin, causing the DRAM to read the row address. Internally, the DRAM connects the selected row to a bank of amplifiers called sense amplifiers, which read the contents of all the capacitors in the row. The control circuit then places the column number of the desired location on the same address pins, and toggles the column address select (CAS) pin, causing the DRAM to read the column address. The DRAM uses this to select the output of the sense amplifier corresponding to the selected column. After a delay called the CAS access time, this output is presented to the outside world on the DRAM's data I/O pin.

To write data to the DRAM, the control logic uses the same two-step addressing method, but instead of reading the data from the chip at the end of the operation, it provides data to the chip at the start of the operation.

After a read or write operation, the control circuit returns the RAS and CAS pins to their original states to ready the DRAM for its next operation. The DRAM requires a certain interval called the precharge interval between operations.

Once the control circuit has selected a particular row, it can select several columns in succession by placing different column addresses on the address pins, toggling CAS each time, while the DRAM keeps the same row activated. This is quicker than accessing each location using the full row-column procedure. This method is useful for retrieving microprocessor instructions, which tend to be stored at successive addresses in memory.

In addition, the provision of commands is typically provided through command strobes on the command bus. The number of different commands depends on the number of pins on the command bus with $2^N$ commands being a possibility with N being the number of pins at the command bus. With the increasing demand for different commands, the command bus needed to be expanded. However, as die size is a crucial factor in application specific integrated circuit (ASIC) design, the number of pins on the command bus needs to be decreased.

Further, the size of the buses is also relevant for the overall size of the connection interface between the memory device and the central processing unit (CPU). The higher data rates that were required, the higher the number of connection pins on the data bus were selected. This increased the size of the interface. In addition, the number of pins on the address bus and the overall number of pins of the interface determined the type of memory to be used on the interface, besides protocol issues. However, the demand for flexibility of usage of different kinds of memory devices was not accounted for. There is a need for a flexible interface, which enables the use of different kinds of memory devices with different kinds of capabilities in terms of data throughput on the data bus.

With the rising need for flexible use of standard components, there is a need for providing a memory interface enabling to use both volatile memory and non-volatile memory on one same interface. However, as non-volatile memory and volatile memory have different prerequisites for the interfaces, there needs to be a possibility to adapt the interface for use with both types of memory.

BRIEF SUMMARY OF THE INVENTION

According to an aspect of the invention there is provided a method for accessing data stored in a memory device through an interface, with addressing data on the memory device through at least one address bus, controlling at least data flow to and from the memory device through at least one command bus, and transferring data to and from the memory through at least one data bus, wherein commands on the command bus are adjusted depending on the type of memory connected to the interface.

According to another aspect, there is provided an interface for interfacing between an integrated circuit and a memory device comprising address bus pins for addressing data, control bus pins for controlling at least data flow to and from the memory device, data bus pins for transferring data to and from the memory device, and the interface is arranged to adjust commands on the command bus depending on the type of memory device connected to the interface.

One other aspect of the invention is a computer-system comprising a central processing unit and a memory device, where the central processing unit is in connection with the memory device via such an interface.

A further aspect of the invention is a computer program product with a computer program stored thereon, the program comprising instructions operating at least one processor to transfer data between a memory device and an integrated circuit such that the commands on the command bus are adjustable depending on the type of memory device connected to the interface.

A further aspect of the invention is a mobile communication device with a central processing unit and a memory device comprising an interface for interfacing between the CPU and the memory device comprising address bus pins for addressing data on the memory device, control bus pins for controlling at least data flow to and from the memory device, data bus pins for transferring data to and from the memory device, and the interface is arranged to adjust commands on the command bus depending on the type of memory device connected to the interface.

BRIEF DESCRIPTION OF THE DRAWINGS

In the drawings show:

FIG. 2 a table with different command to be transferred on the command sub-bus, according to one embodiment;

DETAILED DESCRIPTION OF THE DRAWINGS

Figure 1:
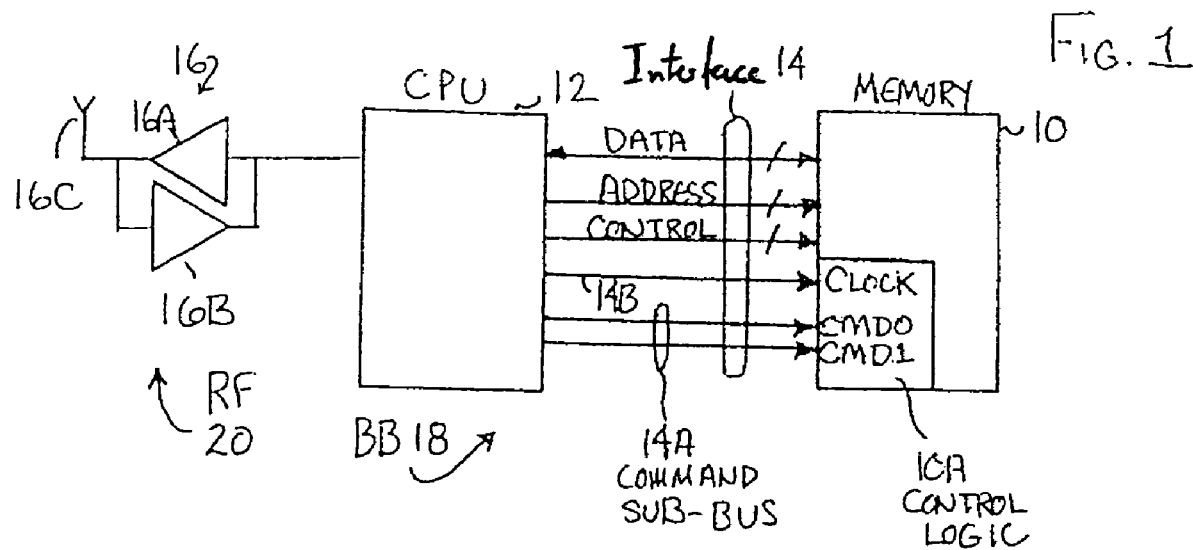
FIG. 1 a simplified block diagram of a central processing unit coupled to memory unit through a bus, where the bus includes a plurality of command signal lines, address signal lines clock signal lines and control signal lines.

By way of introduction, the embodiments of this invention reduce a number of IC pins needed for connecting an integrated circuit, such as a memory integrated circuit, such as a dynamic RAM (DRAM), to other circuitry, such as baseband circuitry in a portable wireless communications terminal. In addition, by way of the flexible provision of data flow rates on the data bus, bus width and timing, different types of memory devices can be supported by a common interface according to embodiments. For example, different volatile memory devices, such a Static Random Access Memory (SRAM) and dynamic random access memory (DRAM) can be used on a same interface as well as various non-volatile memory, for example NOR and NAND flash memory, or Non-Volatile Random Access Memory (NVRAM). Flash memory can be used as execution In Place (XIP) modules, which can also be run on the common interface.

Extending the use of current memory interfaces to Non-volatile memories may require a memory controller design which takes the varying initial access times (first latency) between different technologies into account. For example different Non-volatile memories and even different volatile memory technology may have different latency times. In addition, the burst mode latency can differ for different memory technologies, which also has to be accounted for on the common interface. Further, write protection may be necessary for some types of memory, whereas other types of memory may not require write protection.

The decision of which type of memory is used may depend on the category of the device. In the low category devices, the Non-volatile memories equipped with a flexible interface as described in this application could be used. This can be the same advanced DRAM interface as is used for DRAM memory with adequate performance, thus removing the need for one tailored interface for different types of memory entirely. In the case of a device that has no need for DRAM memory but just for non-volatile memory, the inventive interface gives a better performance for the system than any of the existing interfaces for non-volatile types of memory. The interface according to embodiments gives the possibility to append interleaving and pipelining to the system independently of the used type of memory.

If needed, in particular in high and mid-category devices, the interface could simply be multiplied to cover Static Random Access Memory (SRAM) and dynamic random access memory (DRAM), various non-volatile memory, for example NOR and NAND flash memory, or Non-Volatile Random Access Memory (NVRAM), and Mass Memory types, thus making system design easier and less expensive.

The embodiments of this invention provide a novel technique for providing control and addressing data on a common interface to the memory device by adjusting commands on the command bus depending on the type of memory connected to the interface.

Adjusting the command can comprise selecting the type of memory supported by the interface using a chip select signal.

Further, a first latency can be adjusted depending on the type of memory connected to the interface using commands on the command bus. The first latency can be set during configuration of the interface for accessing the memory.

In addition, the first latency can be adjusted by changing latency register setting within the memory.

Moreover, optionally a burst mode latency can be adjusted depending on the type of memory connected to the interface using commands on the command bus.

To enable the use of different types of memory, write protecting at least parts of the memory using write protection commands on the command bus may be supported. The write protecting can comprise using write protection commands on the address bus. Certain address areas of non-volatile memory can be protected using commands reserved for volatile memory on the command bus.

Differential clock timing, differential strobe timing, variable clock frequency, and reliability with optional DLL can be provided. In addition, the values for setting the flexible interface configuration can be, for example, stored in the memory devices by providing a special register storing differential timing data.

FIG. 1 is a simplified block diagram of a memory unit 10 coupled to a central processing unit (CPU) 12 through a interface 14. In addition to conventional bidirectional data signal lines, address signal lines, and control signal lines (such as a read/write signal line), the interface includes a command sub-bus 14A and a clock signal line 14B. For the case where the memory unit 10 is located in an IC separate from the CPU 12, each of the interface 14 signal lines needs to be connected to the memory unit 10 via an IC pin or terminal. In other embodiments, the memory unit 10 and the CPU 12 may be integrated on, or otherwise combined within, the same IC package. However, in this case the interface 14 still interfaces to the memory unit 10. Control functions for interfaced memory devices can be carried out by either the logic on the integrated circuit or an additional CPU.

Note that some signal lines could be placed in an optional control bus.

The buses can be the control, address and data (includes data strobes) buses shown in FIG. 1. Clock signal(s) are not typically referred to as a bus. In traditional memories, there is a single clock signal, but in more advanced memories, a differential clock is used, which requires two signal lines.

The interface 14 between the CPU and the memory device can be configured by the address bus for addressing data, by the control bus for controlling at least data flow to and from the dynamic random access memory, by the data bus for transferring data to and from the dynamic random access memory, and by the clock 14B for providing clocking signals to the dynamic random access memory. The control bus can be extended by command sub-bus 14A. The command sub-bus 14A can be used to adjust latency timing and/or to provide write protection modes.

The interface 14 can be arranged to vary the data flow rate on the data bus for transferring data to and from the dynamic random access memory 10. The interface can receive on the control bus instructions to vary the data flow rate such that the number of data bits transferred on the data bus within one clock cycle is adjustable through at least one command on the control bus. The data flow rate can be stored in a special register of the DRAM 10.

The data bus width on the data bus can be changed to, for example, ×2, ×4, ×8, ×16, etc. These values can be provided on the control bus. The values can be stored in a special register.

The described interface 14 allows connecting different types of memory 10 to the CPU, where the capabilities of the memory can be accounted for through setting the data flow rate, the data bus width, the latency, the burst mode, and/or write protection, accordingly. Low end systems can be operated with low pin count and low data rate, whereas high end systems can be operated with a higher data rate, which can be supported by higher quality memory 10.

The data cycles per clock and the burst length can be set through mode register set (MRS) cycles, for example. The values can be set separately. One MRS cycle can be used to configure the burst length and one MRS cycle can be used to configure the data cycles per clock.

The clock frequency on clock 14B can also vary. For example, values between 1 MHz and 266 MHz, and even higher, are possible. With a digital locked loop (dll) option in the memory 10 activated, the clock and strobes can be kept synchronized. The DLL can be stabilized with additional clocks when the clock frequency changes dynamically.

For a case where memory unit 10 and CPU 12 form a part of a communications terminal, such as a cellular telephone, there may also be a wireless section, such as a radio frequency (RF) transceiver 16 having an RF transmitter 16A and an RF receiver 16B for coupling to at least one antenna 16C. In this case, the memory 10 and the CPU 12 may be considered to form a part of a baseband (BB) section 18 of the communications terminal, as opposed to an RF section 20. Note that in this embodiment the CPU 12 may be, or may be coupled to, a digital signal processor (DSP) or equivalent high speed processing logic.

In general, the various embodiments of a device wherein the circuit constructed and operated in accordance with this invention can be included in, but are not limited to, cellular telephones, personal digital assistants (PDAs) having or not having wireless communication capabilities, portable computers having or not having wireless communication capabilities, image capture devices such as digital cameras having or not having wireless communication capabilities, gaming devices having or not having wireless communication capabilities, music storage and playback appliances having or not having wireless communication capabilities, Internet appliances permitting wireless or wired Internet access and browsing, as well as portable units, terminals and devices that incorporate combinations of such functions.

Note in the embodiment of FIG. 1 that the command sub-bus 14A includes two signal lines, labelled CMD0 and CMD1. There can also be more than two signal lines on command sub-bus 14A. The circuit can operate with n consecutive edge transitions of the clock signal on the sub-command bus, where n>=2.

The state of each command sub-bus 14B signal line can be sampled twice per clock pulse, once on the rising edge and once on the falling edge. This yields two signal line states per clock pulse, and an ability to encode up to 16 individual commands using two command signal lines in the command sub-bus 14A. Note that the clock edge sampling could be arranged so that the falling edge was used first to sample CMD0 and CMD1, followed by the next rising edge. In either case two consecutive clock edges are used to sample the state or level of at least one other signal line to determine the information that is encoded by the level(s) of the at least one other signal line.

The advanced commands can be as illustrated in FIG. 2. For example an MRS cycle can be entered with CMD0 high ("1") and CMD1 high ("1") on the rising edge of the clock signal 14B, and CMD0 low ("0") and CMD0 low ("0") on the falling edge of the clock signal 14B. This sequence of four command signal line states (1100, as in FIG. 3) is interpreted by control logic 10A in the memory unit 10 as a receipt of the Mode Register Set (MRS) command. The MRS command allows entering in a mode register set command mode, where the setting for burst length, data cycles per clock, data bus width, first latency, burst latency, write protection, etc. can be configured.

FIG. 2 illustrates an exemplary set of commands used for SRAM, DRAM, NAND and NOR flash memory, and/or NVRAM at the same time. DRAM does not require the whole set of commands. The interface 14 can utilize the commands, which are not occupied by a sole DRAM or SRAM use of the interface. The same set of commands used for DRAM or SRAM can be applied to use also Non-Volatile memories on the interface 14. For example, changing the first latency time can be done by taking into use two RFU commands defined for DRAM or SRAM use. These two commands can be the non-volatile command 1 and the non-volatile command 2.

For example non-volatile command1 can be sent from the ASIC to the memory device via interface 14 on sub-command bus 14A with CMD0 high ("1") and CMD1 high ("1") on the rising edge of the clock signal 14B, and CMD0 low ("0") and CMD1 low ("1") on the falling edge of the clock signal 14B.

The reception of this sequence of four command signal line states (1101) is interpreted by control logic 10A in the memory unit 10 as a receipt of a non-volatile command.

When command "1101" is received the memory device may enter a MRS mode. The signals on the address bus can be interpreted as commands. Specific address signals on the address bus can identify certain commands, e.g. non-volatile erase command. The address signal is used to separate different non-volatile specific commands from each other.

Some commands might also be the same as for DRAM and NVRAM e.g. read command (0100).

When using non-volatile memory devices, a command (1110) could also be used with a varying address that can separate the different commands from one another e.g. ID read, erase etc. Both commands "1110" and "1101" may be used or only one of them.

Other examples for implementation could be using commands that are not otherwise used in a non-volatile type of memory, such as autorefresh (0010) or precharge (1001).

If more commands are needed than available by using only "1110" and "1101", then these autorefresh and precharge commands could be used additionally because non-volatile memory does not need the autorefresh or precharge commands. When using autorefresh and precharge as commands for non-volatile memory devices, there is no need to define new commands. This makes it easier to implement in existing devices.

Figure 3:
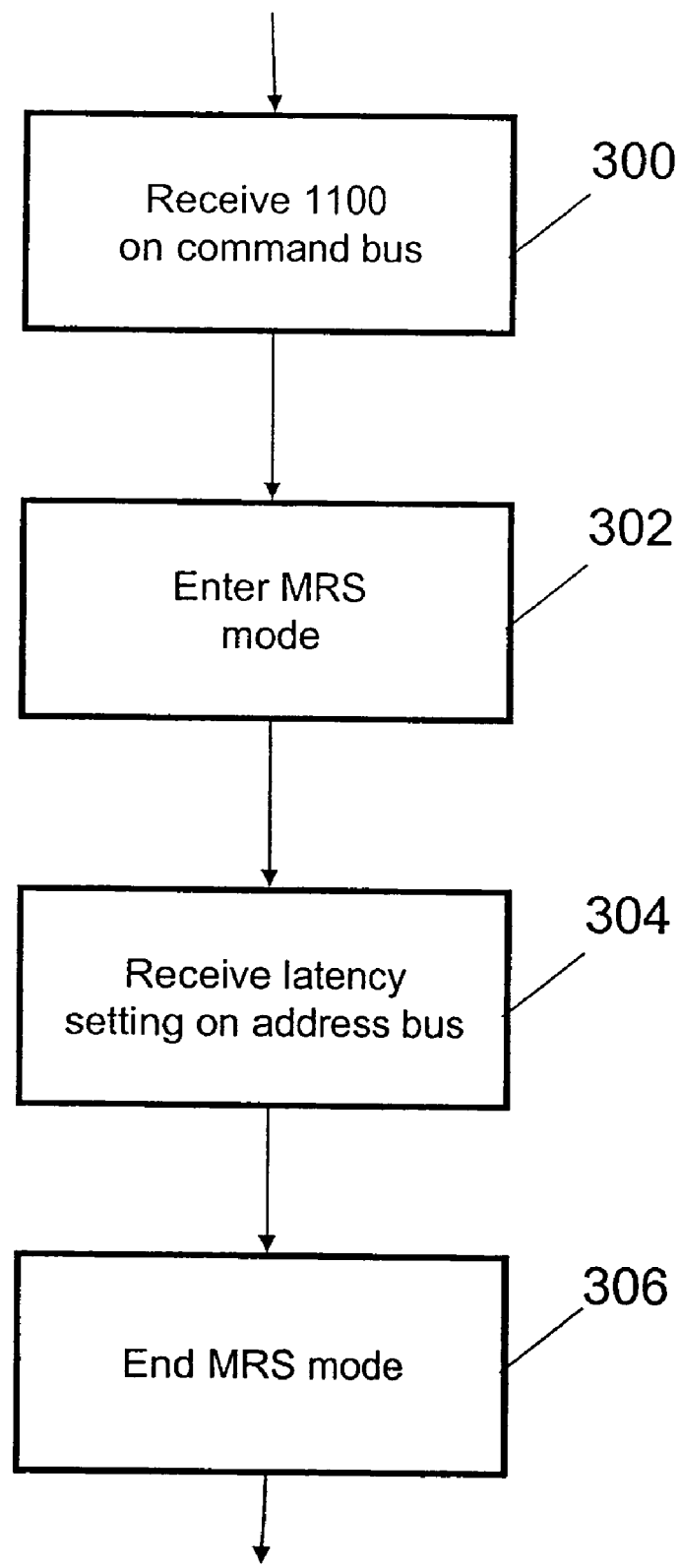
FIG. 3 a flowchart of a latency setting method according to embodiments.

Illustrated in FIG. 3 is a method for setting the latency timing.

Because the Non-volatile memory most likely has a different kind of CAS latency compared to volatile memory, a separate Non-volatile mode register set could be implemented.

For this purpose, a command (1100) could be sent from the CPU 12 to the memory device 10 via interface 14, in particular via sub-command bus 14A (300).

The reception of this command (1100) may be interpreted by the memory device to enter an MRS mode (302). In the MRS mode varying bit patterns in the address and/or data bus lines can be used to set the latency setting (304). This method would enable a significantly increased setting flexibility for the CAS latency.

Current DRAM usually has CAS latency 2 or 3 cycles, which setting is done by the mode register set command. Non-volatile memories probably need bigger values e.g. 10 cycles. Setting 10 cycles is not available in current mode register and therefore a new additional mode register set command might be needed. However DRAM may still use its normal mode register and non-volatile memory devices may have their own mode register with a bigger CAS latency setting.

This MRS mode may be ended (306) after reception of an MRS command (1100) and the latency setting on the address and/or data bus.

In order to set the latency timing, the CPU 12 may request from the memory device 10 via interface 14 its latency set range. The CPU 12 may then set itself and also the memory to a suitable value. However, this can happen also in the way that CPU 12 is already configured during the manufacturing process of the system to a proper set up for latency timing and may set the memory devices via MRS mode to the proper mode.

If non-volatile technology such as NVRAM is used on the same interface as volatile memory, some write protection is necessary. An interface providing write protection can be used with DRAM, SRAM, NVRAM, NOR Flash etc.

An interface with write protect is mainly needed in case of non-volatile memories including important data, like an operating system. However some times it is important to protect data on a volatile memory and therefore a memory interface with write protection improves the functionality of a system even in case of volatile memory access. One example of this kind of situation may be the operating system image, which may have been loaded from mass memory to the volatile memory device.

When code or data is stored in non-volatile memory there is a need to protect some areas, e.g. operating system areas. Current DRAM interfaces do not provide any method to protect non-volatile memory areas.

Having a write protection feature in a common memory interface enables both volatile and non-volatile memories usage with the same interface protocol even on one and the same interface.

Write protection can be introduced using a write protection (WP) signal on the interface 14. This write protection signal can be a signal on the address bus in combination with a special command on the command bus. It can also be introduced as an extended mode register setting or with a separate command on the command bus.

For example the auto-refresh command or the precharge command may be used together with a WP signal on the address bus. The WP signal on the address bus can tell whether the particular addressed block is to be protected or not. One (or more) address signal(s) together with the new write protect command could be used to select the type or protection. Using one particular WP address signal provides write and write&read protection features on the interface.

For example, once a WP signal is received and write protection for a certain address area is actived, no write operations are allowed anymore. The same could be applied to restricted read access. In a more advanced method, one or more address signal(s) together with a new "write protect command" on the command bus could be used to select the type or protection For example the type of protection, e.g. write/write&read protection, can be selected with a particular address signal. The rest of the address signals on the adress bus may be used for selecting the address block(s) to be protected or unprotected. In case the address signals on the address bus are not enough for selecting address blocks, also data signals on the data bus could be used.

Other address signals on the address bus can be used for selecting the block(s) to be protected or unprotected.

The interface enables accessing registers for configuration with a mode register set command. The mode register set command is used to write to these registers. The actual register configuration may be done through address signals. Bank addresses BA0 and BA1 can be used to select the register to be written. BA0='0' and BA1='0' can be used with volatile memory devices to configure the CAS latency, burst type, burst length and so on.

BA0='0' and BA1='1' are used for extended mode register (driver strength, partial array refresh, temperature compensated refresh configuration) with Mobile SDRAM and Mobile DDR. PC DDRs use BA0='1' and BA1='0' for extended mode register (DLL, Drive strength)

Currently BA0='1' and BA1='1' are not used. It is proposed to use BA0='1' and BA1='1' for introducing write protection mode for the flexible interface. The blocks could be protected by issuing "write protect register set" command (mode register command with BA0='1' and BA1='1' addresses).

Figure 4:
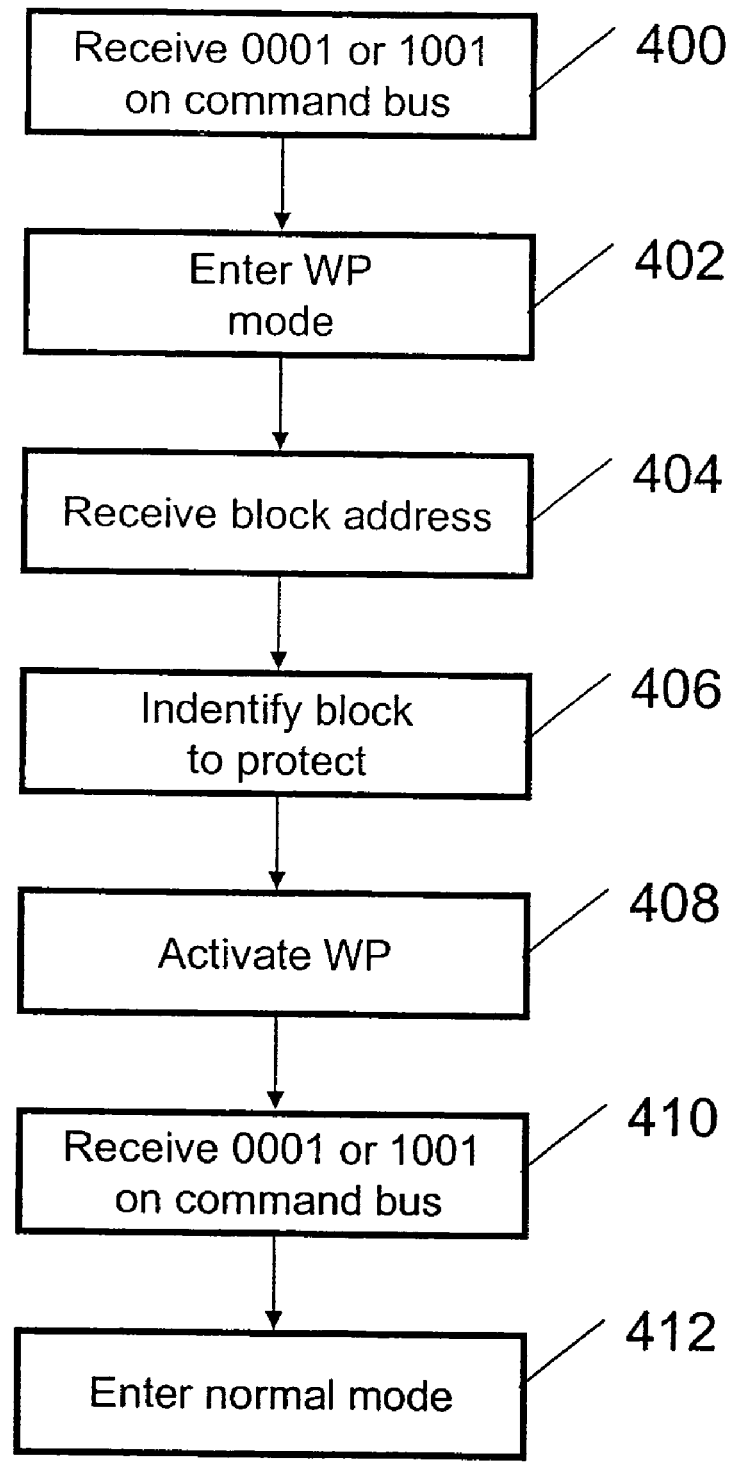
FIG. 4 a flowchart of a write protection setting method according to embodiments.

FIG. 4 illustrates a flowchart for providing write protection to a certain memory area. When using non-volatile memories on the interface, the commands auto-refresh and precharge are not used on the control bus, as indicated above. The commands self-refresh entry and exit might not necessarily be needed with volatile memory devices. Utilizing these commands in non-volatile memories could allow putting these memories into a write protection mode. In case volatile memory is used, these commands cannot be used for write protection. New commands are necessary. In this view, two implementations are possible. According to one implementation, both non-volatile memory and volatile memory use a new command. According to another implementation, non-volatile memory uses existing volatile memory commands, and volatile memory uses new commands.

For example, receiving the auto-refresh command or the self-refresh command (400) on the sub-command bus 14A, the memory device could be put into write protect mode (402).

After receiving (400) one of these commands in non-volatile memory devices, the memory devices can interpret every memory access as a write protect command. In this case, receiving on the address bus a block address (404) may be used to identify (406) which address blocks are to be write protected. However, also a bank or page or any other memory area can be protected with the described method.

For these address blocks, a write protection is activated (408). Whether write protection is activated can depend on the status of lower bits on the address bus. E.g., the lowest bit on the address bus can be used to identify activation of write protection. After the blocks are protected (408), the memory device can again be put back in to normal mode. This can happen by sending again a precharge command or a self-refresh command (410) on interface 14 and entering normal mode (412) after reception of this command.

According to another embodiment, one (or more) address signal(s) together with a write command may be used to indicate whether a password protection is used or not. If only one address signal is used to indicate the password protection, there may be only two states: password protection used and password protection not used.

With more than one address signal available on the address bus, more passwords can be introduced for protection (one user password, operating system password etc). For example, signals on the data bus could also be interpreted as passwords.

When the interface supports burst writes, the password could be delivered in sequences e.g. with 8 word (16 bits) burst, the password length could be 16 bytes. Read commands can still be interpreted on the interface as normal reads, enabling XIP usage.

Write protection according to embodiments can already be used with existing interfaces for memory devices like DDR, SDRAM, or RAMBUS.

Figure 5:
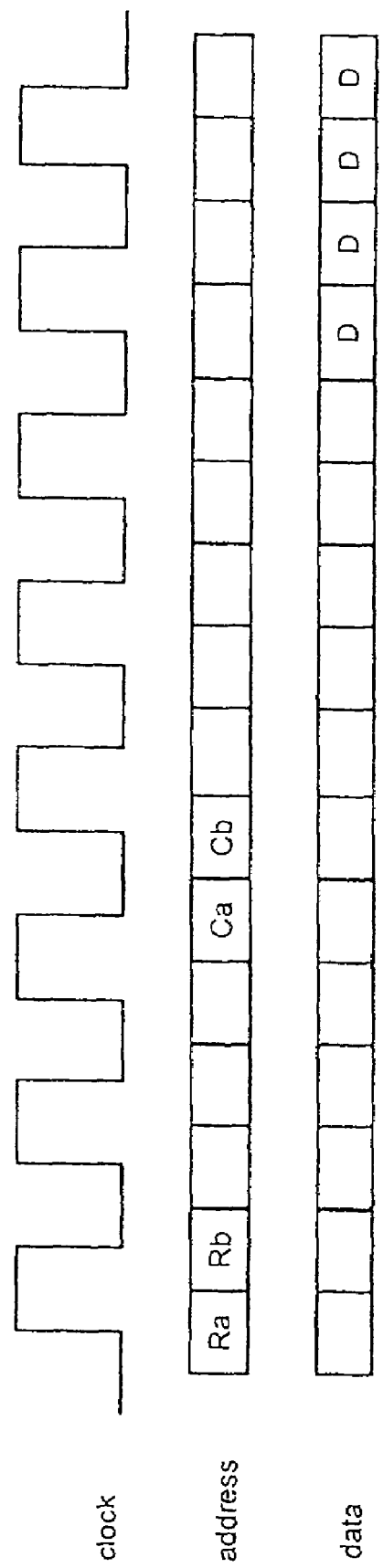
FIG. 5 a timing chart of an memory addressing.

As depicted in FIG. 5, the row address R can be divided into two parts $R_a$, $R_b$ and the column address C can also be divided into two parts $C_a$, $C_b$. By dividing row address R into the parts $R_a$, $R_b$ and column address C into the parts $C_a$, $C_b$, the number of pins at the address bus ADDRESS may be reduced by a factor of substantially two. In the depicted case, the number of parts N=2 and an exemplary address bus size ADR=13 results in the total number pins T according to an inventive embodiment as $$T = \left\lceil \frac{13}{2} \right\rceil = 7.$$

As can be seen from the timing chart at the beginning of the first rising edge the first part $R_a$ of the row address R is provided. After that, at the temporarily following falling edge of the timing clock signal CLOCK or strobe(s), the second part $R_b$ of the row address is provided. By that, with a latency of half a clock period, the complete row address R is provided. With a latency of two rising edges, the column address is provided within two parts, $C_a$, $C_b$.

As can be seen from FIG. 5, the first part $C_a$ of column address C is provided at the first falling edge after the latency of two rising edges. The column address may, however, consist of more than two parts. In such a case, it is possible, according to embodiments, that a first part may already be delivered earlier then the first falling edge, after the latency of two rising edges. The only limit for delivering the column address earlier may be that the row address needs to be fully delivered.

The second part $C_b$ of the column address C may then be provided at the temporarily consecutive rising edge. With the address information being divided into two parts, the row address R is provided with a latency of half a clock cycle and the column address C is provided at the same time as without division of the address information. The data is provided at the data bus at the same time as without division of address information. Column address C is not delayed with half a clock cycle, since the controller or the central processing unit may start sending column address C half a clock period earlier then in case of standard addressing, as addressing is already possible during a falling edge.

Figure 6:
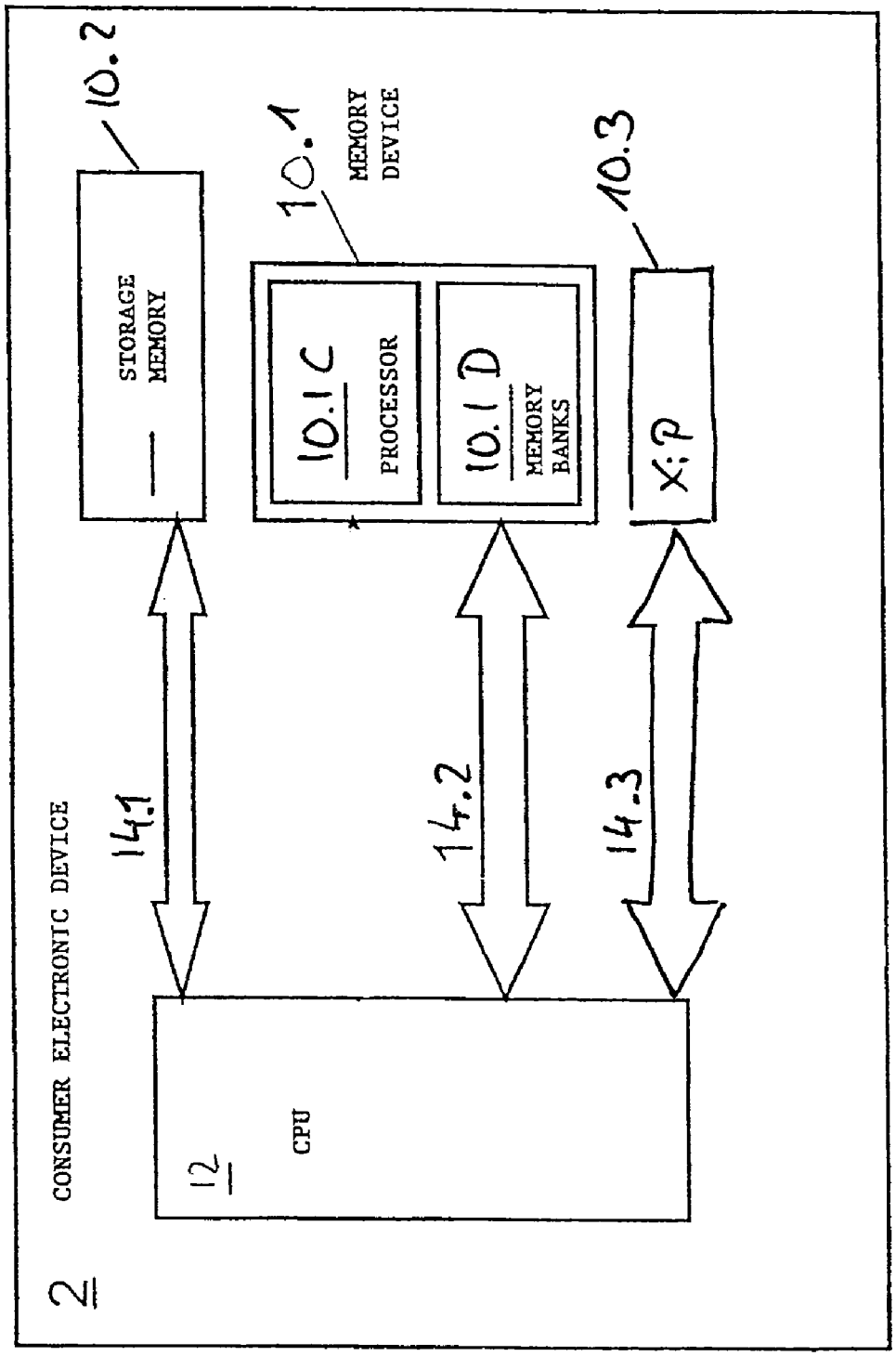
FIG. 6 a consumer electronic device using the method and memory device according to embodiments.

FIG. 6 depicts a consumer electronic device 2 comprising a central processing unit CPU 12, a first common interface 14.1 between CPU 12 and mass memory device 10.2, a second common interface 14.2 between CPU 12 and volatile memory device 10.1 and a third common interface 14.3 between CPU 12 and volatile memory device 10.3 (e.g. XiP). All interfaces 14 are of the same kind. The interface protocol supports mass memory device 10.2, volatile memory device 10.1 and non-volatile memory 10.3 by enabling flexible setting of latency, burst, write protection.

Memory device 10.1 comprises processing means 10.1C, and memory banks 10.1D, for storing the actual data.

Mass memory device 10.2, which may for example be a computer program product, such as a data carrier, may provide a computer program via interface 14.1 to CPU 12 for retrieving data from memory device 10.1 or 10.3.

The computer program comprises instructions operating at least one processor to transfer data between a Dynamic Random Access Memory and an application specific integrated circuit (ASIC) such that the data flow rate a data bus for transferring data to and from the dynamic random access memory is varied such that the number of data bits transferred on the data bus within one clock cycle is adjustable through at least one command on a control bus.

What is claimed is:

1. A method, comprising:
providing access to and from different volatile and non-volatile memory devices with different kinds of capabilities through a common interface, by
addressing data on a connected volatile or non-volatile memory device, and controlling at least data flow to and from the connected memory device through said common interface, and
transferring data to and from the connected volatile or non-volatile memory device through at least one data bus of said common interface,
wherein commands on the common interface are adjusted depending on the volatile or non-volatile memory device connected to said common interface, and
wherein a latency set range of said volatile or non-volatile memory device is requested from the connected volatile or nonvolatile memory device through said common interface,
wherein a latency timing is then set by changing a latency register setting to a value in said latency set range,
such that said different types of volatile or non-volatile memory devices with different kinds of data capabilities are usable with said common interface.

2. The method of claim 1, further comprising setting at least a first latency depending on the memory device connected to the common interface using commands on the command bus to the connected memory device.

3. The method of claim 2, wherein the first latency is set by changing a latency register setting within the memory device.

4. The method of claim 2, wherein the commands for adjusting the first latency are reserved for a different use with other memory devices.

5. The method of claim 2, wherein the first latency is set during configuring the common interface for accessing the connected volatile or non-volatile memory device.

6. The method of claim 1, further comprising setting at least a burst mode latency depending on the type of memory device connected to the common interface using commands on the command bus.

7. The method of claim 1, further comprising selecting the volatile or non-volatile memory device supported by the interface using a chip select signal.

8. The method of claim 1, wherein adjusting the first latency depends on the type of memory device being one of
A) a volatile memory device;
B) a non-volatile memory device.

9. Apparatus, comprising:
a common interface for interfacing between an integrated circuit and any connected one of a plurality of different volatile and non-volatile memory devices with different kinds of capabilities, said common interface for addressing data, and for controlling at least data flow to and from the connected memory device selected from said different volatile and non-volatile memory devices, comprising:
a data bus for transferring data to and from the connected volatile or non volatile memory device, and
the common interface is arranged to adjust commands depending on the volatile or non-volatile memory device connected to the common interface and to request a latency set range of said connected memory device from the connected memory device in order to change a latency register setting, such that said different memory devices with different kinds of capabilities are connectable to said common interface enabling use of said any connected one of said plurality of different volatile and non-volatile memory devices with said common interface.

10. Integrated circuit comprising an apparatus of claim 9.

11. A computer-system comprising a central processing unit and a memory device, where the central processing unit is in connection with the memory device via an apparatus of claim 9.

12. The computer system of claim 11, wherein plural memory devices are in connection with the processing unit.

13. The computer system of claim 11, wherein the processing unit is arranged for selecting the type of memory device connected to the interface.

14. A computer program product with a computer program stored thereon, the program comprising instructions operating at least one processor to transfer data between a memory device selected from different volatile and non-volatile memory devices with different kinds of capabilities and an integrated circuit over a common interface used regardless of the volatile and non-volatile memory device selected such that commands on said common interface are adjustable depending on the volatile and non-volatile memory device connected to the common interface, wherein a latency set range of said connected memory device is requested from the memory device through said common interface to enable a change in a latency register setting, such that said different volatile and non-volatile memory devices with different kinds of capabilities are usable with said common interface.

15. A device comprising:
a central processing unit and a connected memory device selected from different volatile and non-volatile memory devices, said device further comprising a common interface for interfacing between the central processing unit and any volatile and non-volatile memory device selected from among said different volatile and non-volatile memory devices, the common interface for addressing data, and for controlling at least data flow to and from the connected volatile and non-volatile memory device selected from said different volatile and non-volatile memory devices, comprising:
a data bus for transferring data to and from the connected volatile and non-volatile memory device, and
the common interface is arranged to adjust commands depending on the memory device connected to the common interface and to request a latency set range of said memory device from the memory device through said common interface to enable a change in a latency register setting, such that said different volatile and non-volatile memory devices with different kinds of capabilities are connectable to said common interface enabling use of said different volatile and non-volatile memory devices with said common interface.

16. The device of claim 15, where the device is a mobile communication device.

\* \* \* \* \*